(12) United States Patent
Vainer et al.

(10) Patent No.: US 12,039,666 B2
(45) Date of Patent: *Jul. 16, 2024

(54) METHOD FOR CREATING A TANGIBLE OBJECTION AND DIGITIZING THE TANGIBLE OBJECT USING AN ARTIFICIAL INTELLIGENCE PROCESS

(71) Applicant: ALL TINGZ CO., La Jolla, CA (US)

(72) Inventors: Daniela Vainer, La Jolla, CA (US); Merve Cerit, Davutlar Mah. (TR)

(73) Assignee: ALL TINGZ CO., La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,019

(22) Filed: May 18, 2023

(65) Prior Publication Data
US 2023/0290058 A1    Sep. 14, 2023

Related U.S. Application Data

(63) Continuation of application No. 17/374,430, filed on Jul. 13, 2021, now Pat. No. 11,657,569.

(51) Int. Cl.
| G06T 17/10 | (2006.01) |
| G06N 5/04 | (2023.01) |
| G06T 13/40 | (2011.01) |

(52) U.S. Cl.
CPC .............. *G06T 17/10* (2013.01); *G06N 5/04* (2013.01); *G06T 13/40* (2013.01); *G06T 2200/08* (2013.01)

(58) Field of Classification Search
None
See application file for complete search history.

(56) References Cited

U.S. PATENT DOCUMENTS

| 11,366,989 | B2 * | 6/2022 | Nir | G06F 18/24 |
| 11,657,569 | B1 * | 5/2023 | Vainer | G06T 17/10 |
| | | | | 345/420 |
| 2016/0193537 | A1 * | 7/2016 | May | A63F 13/63 |
| | | | | 463/31 |
| 2019/0347526 | A1 * | 11/2019 | Sunkavalli | G06N 3/084 |
| 2022/0148279 | A1 * | 5/2022 | Kang | G06F 3/04845 |

* cited by examiner

*Primary Examiner* — Nurun Flora
(74) *Attorney, Agent, or Firm* — Richard T. Ogawa; Ogawa P.C.

(57) ABSTRACT

According to the present invention, techniques, including a method, and system, for creating a tangible object having customized features and digitizing the object for manipulation and use by a child user are provided. In particular, the invention provides a method for assembling customized features onto a tangible object and using artificial intelligence techniques for digitizing the object onto a computing device for manipulation and use by a child user.

18 Claims, 17 Drawing Sheets

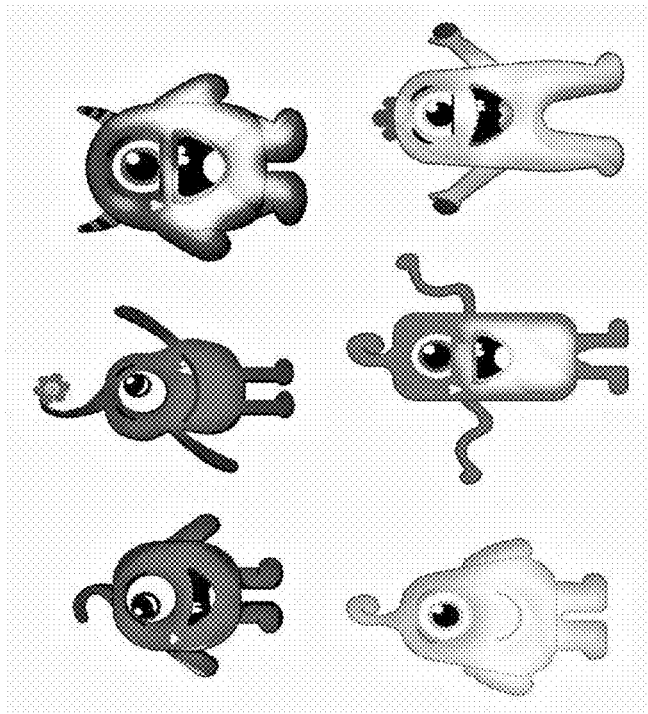
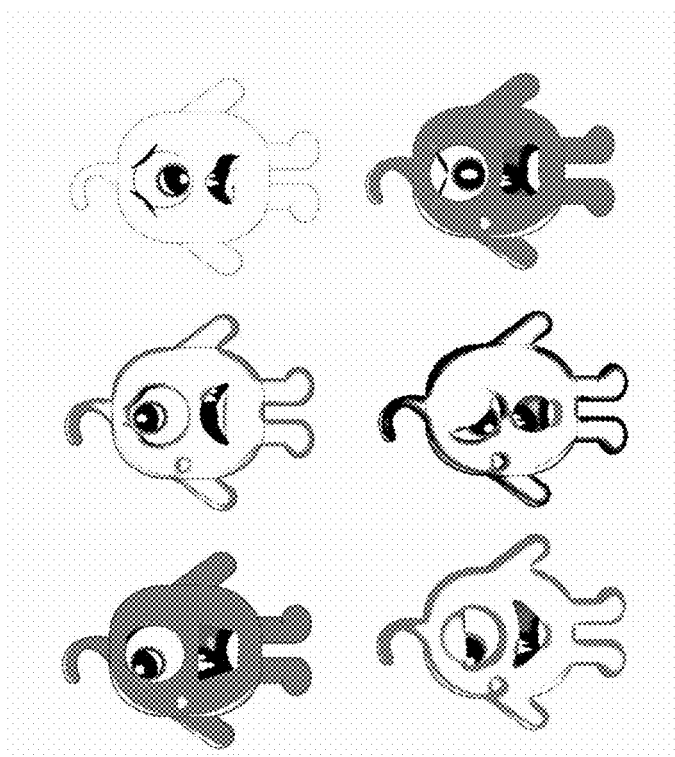
Figure 8

METHOD FOR CREATING A TANGIBLE OBJECTION AND DIGITIZING THE TANGIBLE OBJECT USING AN ARTIFICIAL INTELLIGENCE PROCESS

CROSS-REFERENCES TO RELATED APPLICATIONS

This application is a Continuation of U.S. patent application Ser. No. 17/374,430, filed Jul. 13, 2021, now issued as U.S. Pat. No. 11,657,569, on May 23, 2023, the entire contents of which are incorporated herein by reference.

BACKGROUND OF INVENTION

The present invention relates to techniques, including a method, and system, for creating a tangible object having customized features and digitizing the object for manipulation and use by a child user. In particular, the invention provides a method for assembling customized features onto a tangible object and using artificial intelligence techniques for digitizing the object onto a computing device for manipulation and use by a child user. Merely by way of examples, the tangible object can be in the form of a doll, an animal, a creature, or other type of object capable of entertaining the child user.

Children learn to discover the world and themselves, experiment with new ideas, learn with their peers, and tinker with physical objects through tangible play. On top of their exploration in the outside world, they also discover their own inner selves and worlds.

At around thirty six (36) months of age, most children feel and express primary emotions such as anger, surprise and joy, and complex, self-conscious emotions such as pride, shame, and guilt. However, the concept of emotions is hard to untangle for most young children as they do not have the vocabulary to express complex emotions and feelings. Children often try to communicate these emotions in different ways, and sometimes these ways can be limited, ambiguous, inappropriate, or even as dangerous as hurting oneself and others. Oftentimes, emotions translate into crying, temper tantrums, and other undesirable physical acts.

From the above, it is seen that techniques for improving a learning experience for a child is highly desirable.

SUMMARY OF INVENTION

According to the present invention, techniques, including a method, and system, for creating a tangible object having customized features and digitizing the object for manipulation and use by a child user are provided. In particular, the invention provides a method for assembling customized features onto a tangible object and using artificial intelligence techniques for digitizing the object onto a computing device for manipulation and use by a child user. Merely by way of examples, the tangible object can be in the form of a doll, an animal, a creature, or other type of object capable of entertaining or occupying the child user.

In an example, the present invention provides methods and systems that allow kids an ability to turn abstract thoughts and emotions into a physical version they can tinker with, learn from and share with others. Further details of such methods and systems can be found throughout the present specification and more particularly below.

In an example, the present techniques, including methods and systems, are provided to empower kids and parents to discover new ways of recognizing, expressing, and managing their emotions through play, including interaction with tangible objects and digital objects.

In an example, the present method includes providing a tangible body, including a surface region. The method includes providing a plurality of features for the surface region of the body. The method assembles, by the user, the plurality of features onto the body to form a customized tangible body including the features. Each of the features is configured onto a portion of the tangible body in a designated spatial configuration on the portion of the tangible body. The method aligns the customized tangible body, by the user, to an image capturing region of an image capturing device. In an example, the image capturing device is coupled to a computing device, e.g., smart phone, computer, laptop, tablet. The method includes capturing an image of the customized tangible body using the image capturing device in a pixel domain and processing the image in the pixel domain to convert the image in the pixel domain into a portable image file.

In an example, the method processes the portable image file using an artificial intelligence (AI) inference engine to output at least a character type of the tangible body, a type of each of the features, a spatial location of each of the features, and a color of each of the features. In an example, each of such features defines a phenotype of the customized tangible body. In an example, the method stores information associated with the character type, type of each of the features, the spatial location of each of the features, and the color of each of the features into a memory location on the computing device. The method processes each of the phenotypes of the customized tangible body to determine a complete phenotype of the customized tangible body. The method uses the complete phenotype information of the customized tangible body to identify a digital body of the complete phenotype from a plurality of digital bodies stored in a server coupled to the computing device via the Internet or other world wide network or local area network. The method retrieves the digital body from the server and configures the digital body on the computing device. In an example, the method then interacts with an operation of the digital body by the use. In an example, the operation of the digital body includes an interaction with the customized tangible body in digital form using the computing device.

The above examples and implementations are not necessarily inclusive or exclusive of each other and may be combined in any manner that is non-conflicting and otherwise possible, whether they be presented in association with a same, or a different, embodiment or example or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above examples implementations are illustrative, rather than limiting.

BRIEF DESCRIPTION OF THE DRAWINGS

FIG. 8 illustrates a plurality of different digital objects according to examples of the present invention.

DETAILED DESCRIPTION OF THE EXAMPLES

Figure 1:
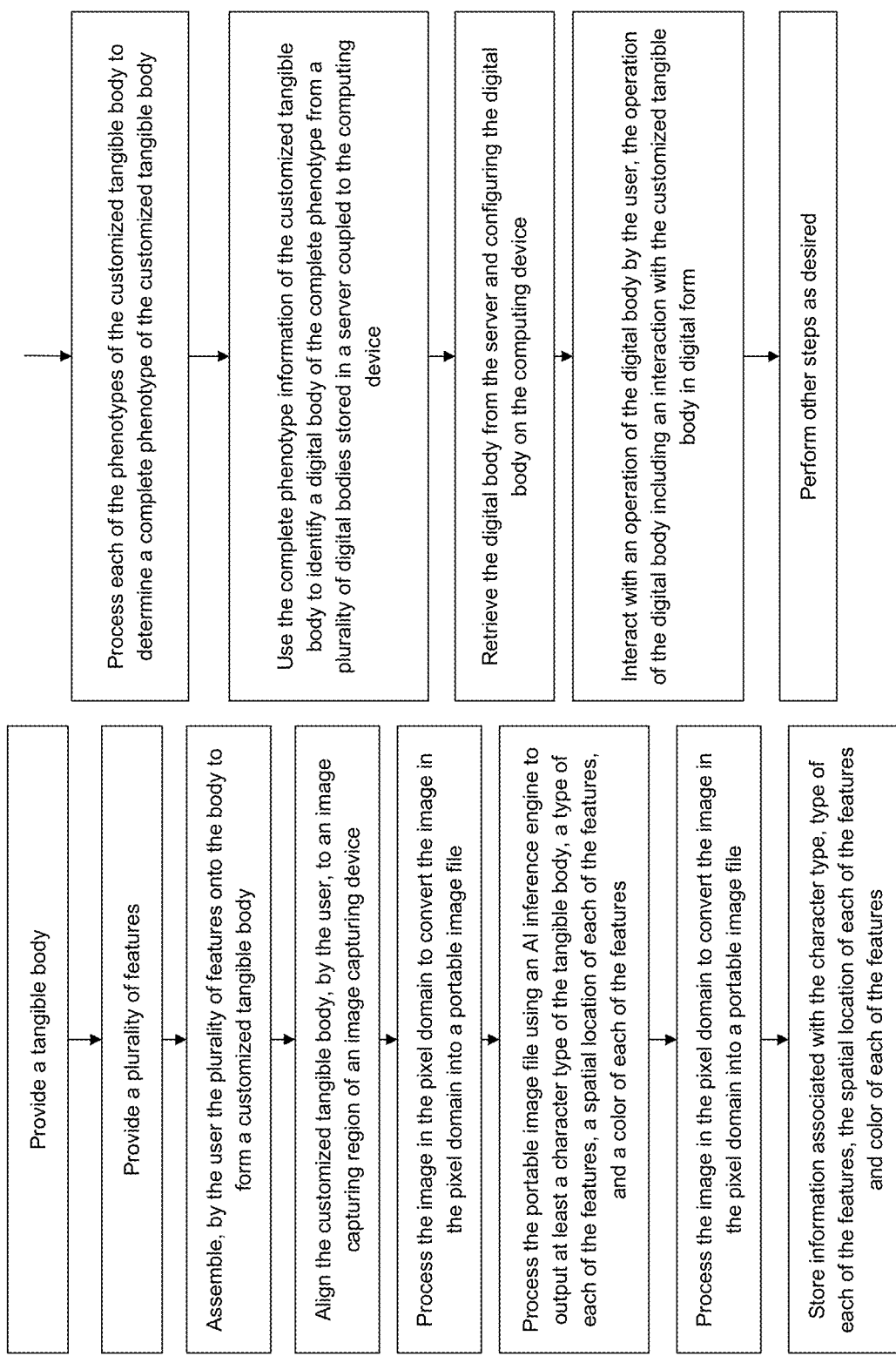
FIG. 1 is a more detailed flow diagram illustrating a process for creating a tangible object for use by a child according to an example of the present invention.

According to the present invention, techniques, including a method, and system, for creating a tangible object having customized features and digitizing the object for manipulation and use by a child user are provided. In particular, the invention provides a method for assembling customized features onto a tangible object and using artificial intelligence techniques for digitizing the object onto a computing device for manipulation and use by a child user. Merely by way of examples, the tangible object can be in the form of a doll, an animal, a creature, or other type of object capable of entertaining or occupying the child user.

In an example the present invention provides a method to create a customized object, and convert the object into digital form for manipulation and use by a child using a computing device. A brief sequence of steps is provided below, which can be referenced by the Figures below.

1. Provide a tangible body, including a surface region;
2. Provide a plurality of features (in tangible form) for the surface region of the body;
3. Assemble, by the user, the plurality of features onto the body to form a customized tangible body including the features, each of the features being configured onto a portion of the tangible body in a designated spatial configuration on the portion of the tangible body;
4. Align the customized tangible body, by the user, to an image capturing region of an image capturing device, e.g., camera, CCD camera, CMOS camera, (the image capturing device being coupled to a computing device);
5. Capture an image of the customized tangible body using the image capturing device in a pixel domain;
5. Process the image in the pixel domain to convert the image in the pixel domain into a portable image file;
6. Process the portable image file using an AI inference engine (or a plurality of AI inference engines) to output at least a character type of the tangible body, a type of each of the features, a spatial location of each of the features, and a color of each of the features, each of which defines a phenotype of the customized tangible body;
7. Store information associated with the character type, type of each of the features, the spatial location of each of the features, and the color of each of the features into a memory location on the computing device or other storage location;
8. Process each of the phenotypes of the customized tangible body to determine a complete phenotype (from a plurality of pre-made complete phenotypes) of the customized tangible body;
9. Use the complete phenotype information of the customized tangible body to identify a digital body of the complete phenotype from a plurality of digital bodies stored in a server coupled to the computing device;
10. Retrieve the digital body from the server (or other storage location) and configure the digital body on the computing device to allow the user to interact with the digital body such that the digital body is displayed on the computing device;
11. Interact with an operation of the digital body by the user by using inputs on the computing device and the display of the digital body, the operation of the digital body including an interaction with the customized tangible body in digital form; and
12. Perform other steps, as desired.

As shown, the above sequence of steps outlines a method according to an example of the present invention. Depending upon the example, one or more elements can be added to the steps. Each of the steps can be modified in any manner without departing from the scope of the claims. Of course, there can be other variations, modifications, and alternatives.

Figure 1A:
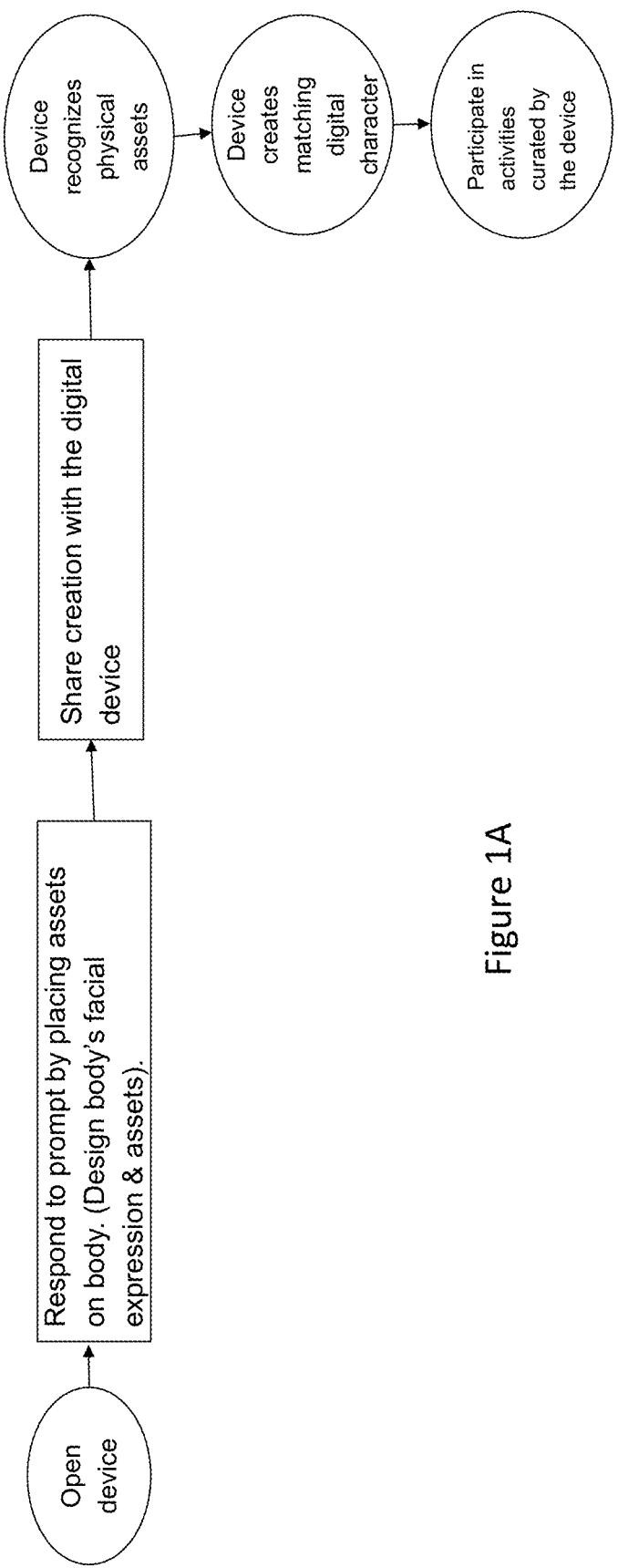
FIG. 1A is a simplified diagram of a flow chart illustrating a process for creating a tangible object for use by a child according to an example of the present invention.

FIG. 1A is a simplified diagram of a flow chart illustrating a process for creating a tangible object for use by a child according to an example of the present invention. As shown, the process begins with a step of "open device," which is often packaged in a box, bag, wrapper, or other enclosure. As shown, the process includes a step of responding to a prompt by placing assets on a body, which includes facial expressions, and other features, and assets, to form a customized tangible object. In an example, the process includes sharing the customized tangible object with an image capturing device. The image capturing device processes the image and recognizes the facial expressions, other features, and assets, and then creates a digital version of the customized tangible object. Once the object has been digitized, the digital object can now be used, manipulated, modified, and perform other functions. Further details of the present process can be found throughout the present specification and more particularly below.

FIG. 1 is a more detailed flow diagram illustrating a process for creating a tangible object for use by a child according to an example of the present invention. In an example the present invention provides a method to create a customized object, and convert the object into digital form for manipulation and use by a child. In an example, the process includes providing a tangible body, including a surface region. The tangible body can come in a variety of shapes and sizes, including features of animals, human, or real or fictional characters. In an example, the color of each of the features comprises one of red, blue, green, yellow, orange, and combinations thereof. In an example, a spatial location is one of an upper portion, a center portion, or a lower portion of the tangible body. Of course, there can be other variations, modifications, and alternatives.

In an example, the process includes providing a plurality of features for the surface region of the body. The features can include, among others, an eye, a mouth, a nose, hair, a clothing item, a decoration, or other assets. Of course, there can be other variations, modifications, and alternatives.

In an example, the process includes assembling, by the user, the plurality of features onto the body to form a customized tangible body including the features. In an example, each of the features being configured onto a portion of the tangible body in a designated spatial configuration on the portion of the tangible body. The customized tangible body is created by the user, often a child, for entertainment and learning purposes.

Once the body has been created, the body is aligned, by the user, to an image capturing region of an image capturing device. In an example, the image can be realigned and the image recaptured if the original image is not captured correctly or accurately. Once the image has been captured correctly, the method performs additional steps. In an example, the image capturing device being coupled to a computing device. The image capturing device can be a CMOS (complementary metal oxide silicon) sensor based camera or CCD (charge coupled device) sensor based camera, or other camera or imaging device configured on a personal computer, laptop, notebook, tablet such as an iPad™ by Apple Computer or cell phone, including iPhone™ and others. In other examples, the image capturing device can rely upon other sensing devices.

In an example, the process includes capturing an image of the customized tangible body using the image capturing device in a pixel domain. The image can be captured using at least one or multiple sensing arrays configured on a computing device or mobile device. The image is in a pixel domain. In an example, the method includes processing the image in the pixel domain to convert the image in the pixel domain into a portable image file. In an example, the portable image file is one of a PNG, GIF, HEIC, TIFF, and other suitable formats.

In an example, the process includes processing the portable image file using an artificial intelligence ("AI") inference engine to output at least a character type of the tangible body, a type of each of the features, a spatial location of each of the features, and a color of each of the features. Each of which defines a phenotype of the customized tangible body. In an example, the AI inference engine determines P(object) consisting of or comprising an objectness score. The AI inference engine determines Bo_x, Bo_y, Bo_w, and Bo_h, each of which corresponds to a coordinate and a size of a bounding box containing the object. The AI inference engine determines P(character_i), i being 1 to n(number of possible characters). In an example, the AI inference engine determines P(color_i), i being 1 to m(number of possible colors). In an example, the AI inference engine determines P(feature) consisting of an objectness score. In an example, the AI inference engine determines Bf_x, Bf_y, Bf_w, and Bf_h each of which is a coordinate and a size of a bounding box containing the feature. In an example, the AI inference engine determines P(feature_i), i being 1 to k(number of possible features). Of course, there can be other variations, modifications, and alternatives.

In an example, the process stores information associated with the character type, type of each of the features, the spatial location of each of the features, and the color of each of the features into a memory location on the computing device or other device. In an example, the process processes each of the phenotypes of the customized tangible body to determine a complete phenotype of the customized tangible body. In an example, the process uses the complete phenotype information of the customized tangible body to identify a digital body of the complete phenotype from a plurality of digital bodies stored in a server coupled to the computing device.

In an example, the process allows a user to the digital body from the server and configuring the digital body on the computing device. The user can interact with an operation of the digital body. In an example, the operation of the digital body includes an interaction with the customized tangible body in digital form using inputs and display of the computing device. In an example, the interaction with the customized tangible body includes reading a story, telling a story, drawing, singing, dancing, animations, and combinations thereof. Of course, the process can also perform other steps, as desired.

As shown, the above sequence of steps outlines a method according to an example of the present invention. Depending upon the example, one or more elements can be added to the steps. Each of the steps can be modified in any manner. The tangible body can come in a variety of shapes and sizes, including features of animals, humans, or fictional characters. In an example, the color of each of the features comprises one of red, blue, green, yellow, orange, and combinations thereof. In an example, a spatial location is one of an upper portion, a center portion, or a lower portion of the tangible body. Of course, there can be other variations, modifications, and alternatives without departing from the scope of the claims. Of course, there can be other variations, modifications, and alternatives.

Figure 2:
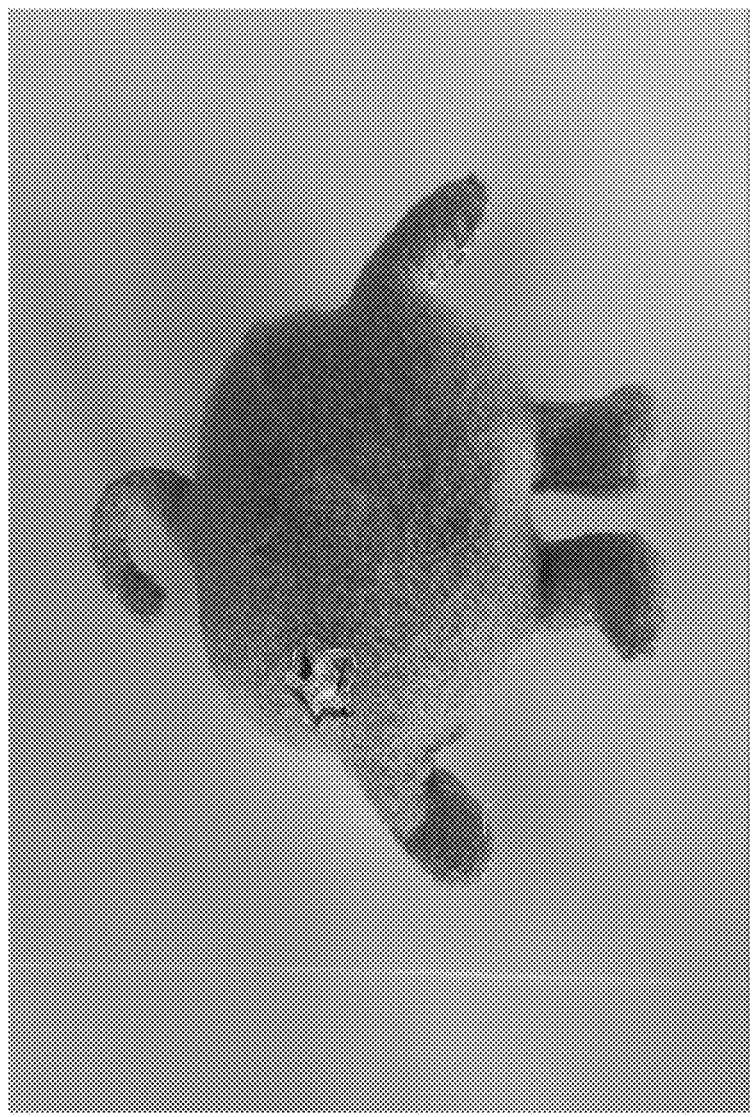
FIG. 2 is a simplified illustration of a tangible object without features according to an example of the present invention.

FIG. 2 is a simplified illustration of a tangible object without features according to an example of the present invention. In an example, the tangible body can come in a variety of shapes and sizes, including features of animals, human, or fictional characters. In an example, the color of each of the features comprises one of red, blue, green, yellow, orange, and combinations thereof. In an example, a spatial location is one of an upper portion, a center portion, or a lower portion of the tangible body. As shown, the body has an emblem including a star. Of course, there can be other variations, modifications, and alternatives.

Figure 3:
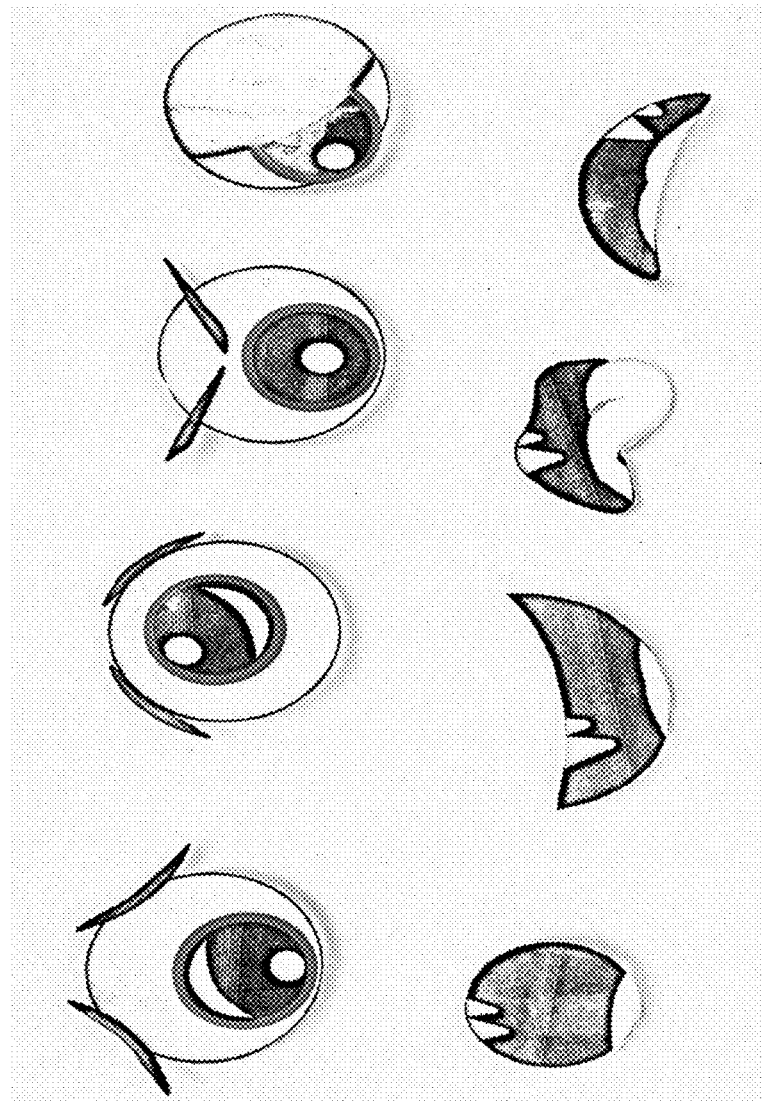
FIG. 3 is a simplified illustration of a plurality of features according to an example of the present invention.

FIG. 3 is a simplified illustration of a plurality of features according to an example of the present invention. In an example, the process includes providing a plurality of features for the surface region of the body. The features can include, among others, an eye, a mouth, a nose, hair, a clothing item, a decoration, or other assets. Of course, there can be other variations, modifications, and alternatives.

Figure 4:
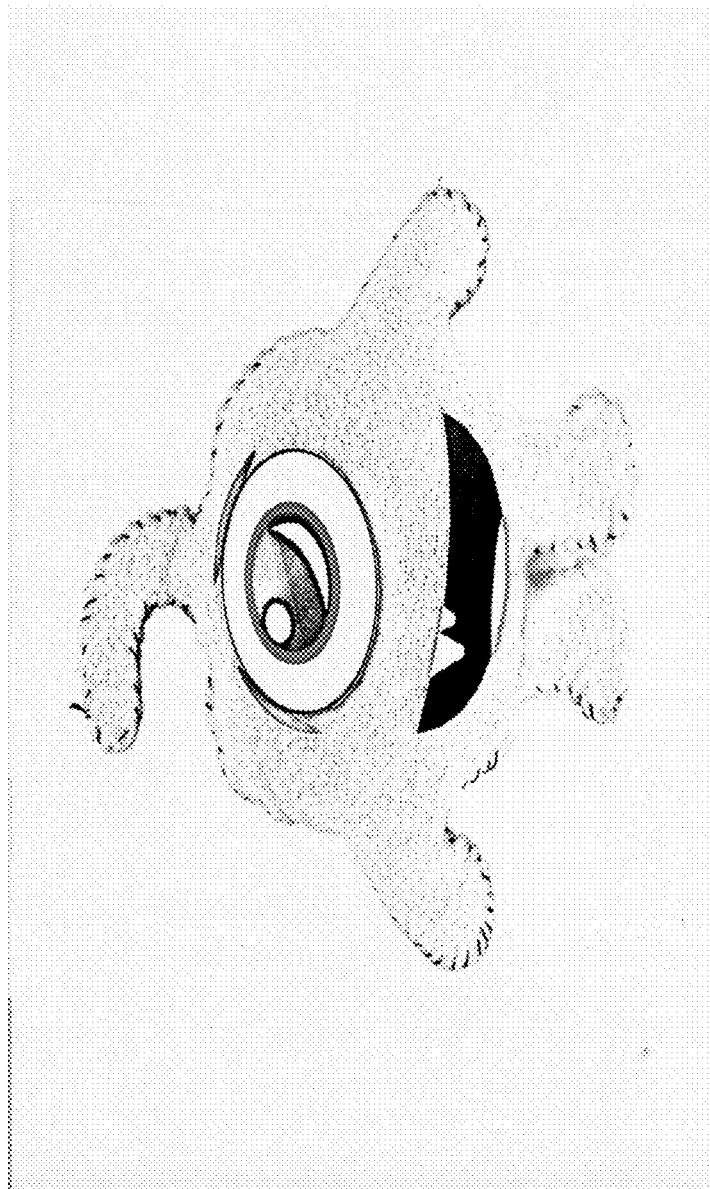
FIG. 4 is a simplified illustration of a customized tangible object according to an example of the present invention.

FIG. 4 is a simplified illustration of a customized tangible object according to an example of the present invention. In an example, the process includes assembling, by the user, the plurality of features onto the body to form a customized tangible body including the features. In an example, each of the features being configured onto a portion of the tangible body in a designated spatial configuration on the portion of the tangible body. The customized tangible body is created by the user, often a child, for entertainment and learning purposes.

Figure 5:
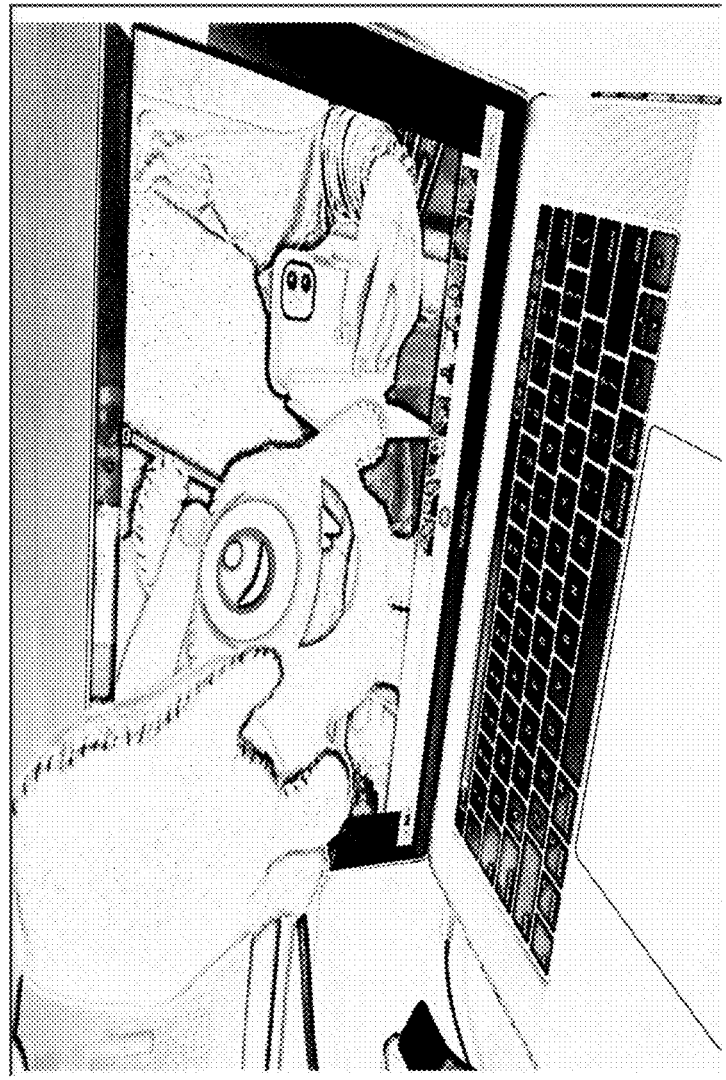
FIG. 5 is an illustration of capturing an image of the customized tangible object according to an example of the present invention.

FIG. 5 is an illustration of capturing an image of the customized tangible object according to an example of the present invention. Once the body has been created, the body is aligned, by the user, to an image capturing region of an image capturing device. In an example, the image capturing device being coupled to a computing device. The image capturing device can be a CMOS sensor based camera, or other camera or imaging device configured on a personal computer, laptop, notebook, tablet such as an iPad by Apple Computer or cell phone, including iPhone and others. In other examples, the image capturing device can rely upon other sensing devices.

In an example, the process includes capturing an image of the customized tangible body using the image capturing device in a pixel domain. The image can be captured using at least one or multiple sensing arrays configured on a computing device or mobile device. The image is in a pixel domain. In an example, the method includes processing the image in the pixel domain to convert the image in the pixel domain into a portable image file. In an example, the portable image file is one of a PNG, GIF, HEIC, TIFF, and other suitable format.

Figure 6:
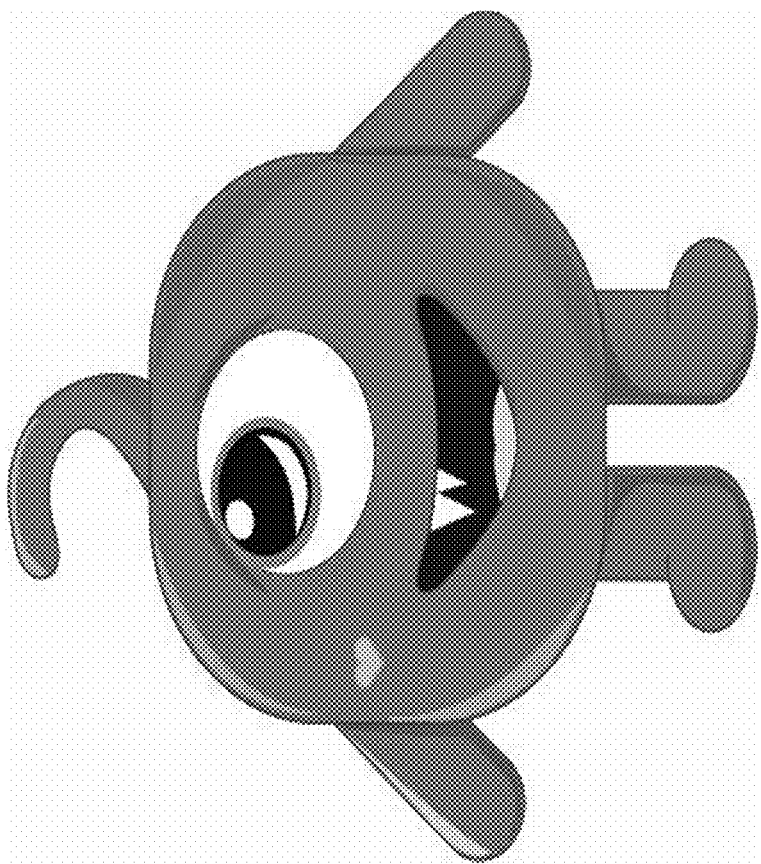
FIG. 6 is an image of a digitized customized object according to an example of the present invention.

FIG. 6 is an image of a digitized customized object according to an example of the present invention. As shown, the object is provided in digital form and displayed on a screen of a mobile or stationary computing device or mobile phone. Once the digital image is created, the user can use them.

Figure 7:
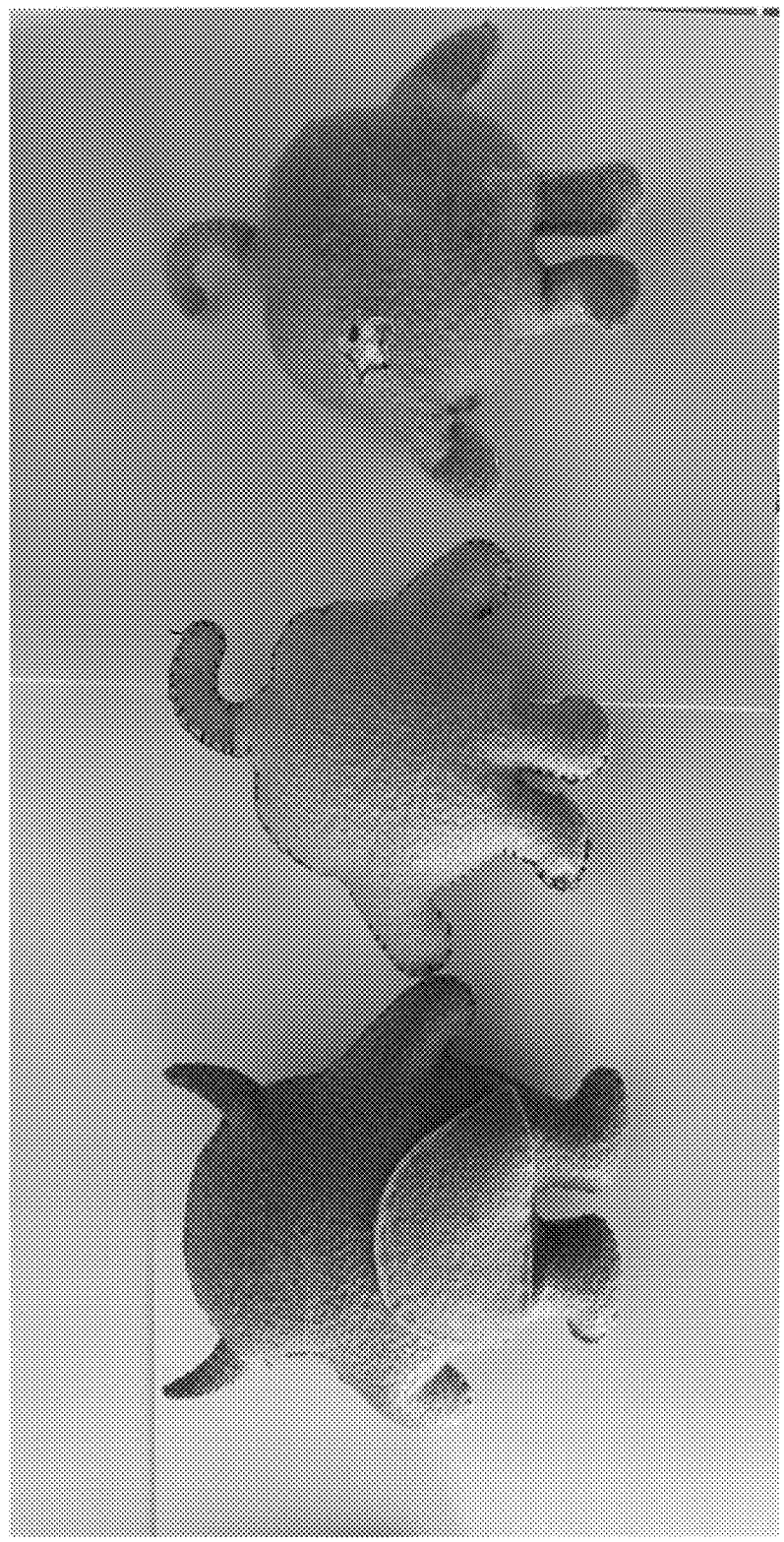
FIG. 7 illustrates a plurality of different tangible objects according to examples of the present invention.
Figure 9:
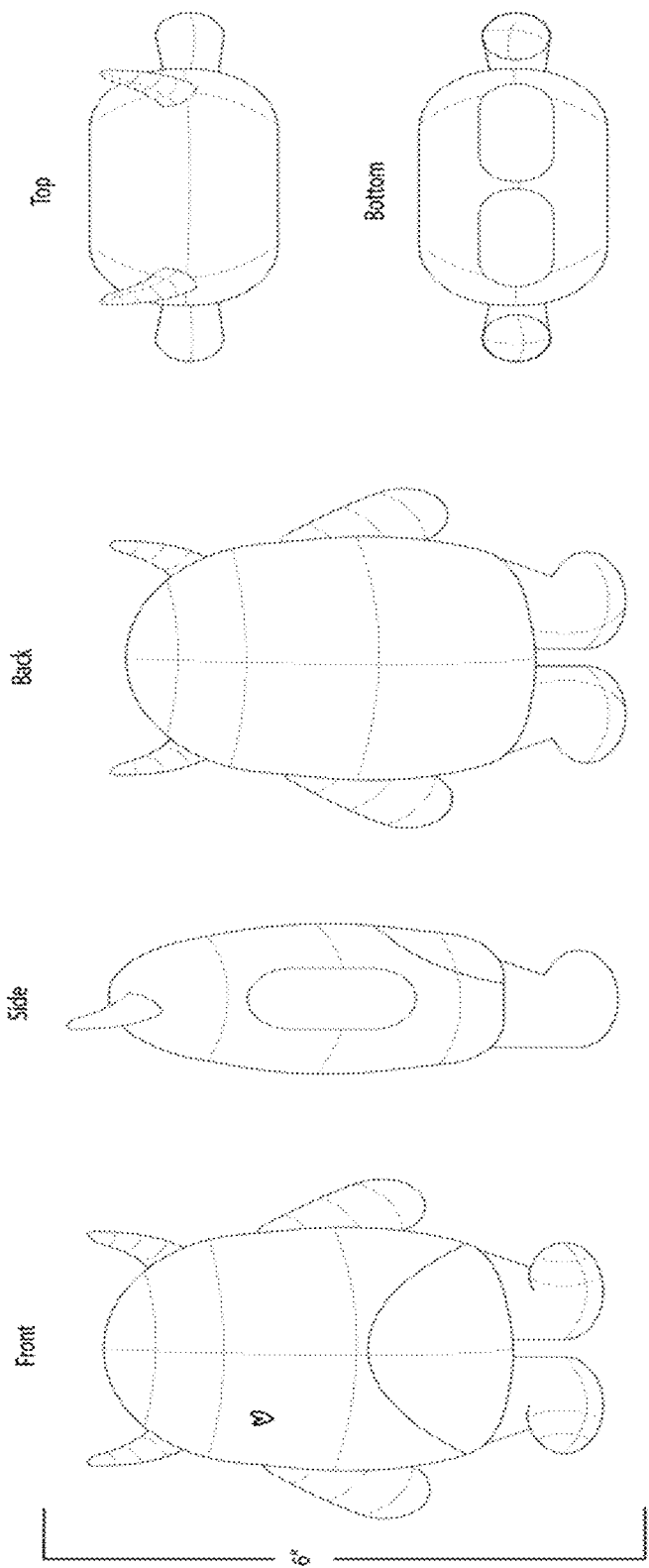
FIGS. 9-12 illustrates a digital object in each of its views according to an example of the present invention.
Figure 10:
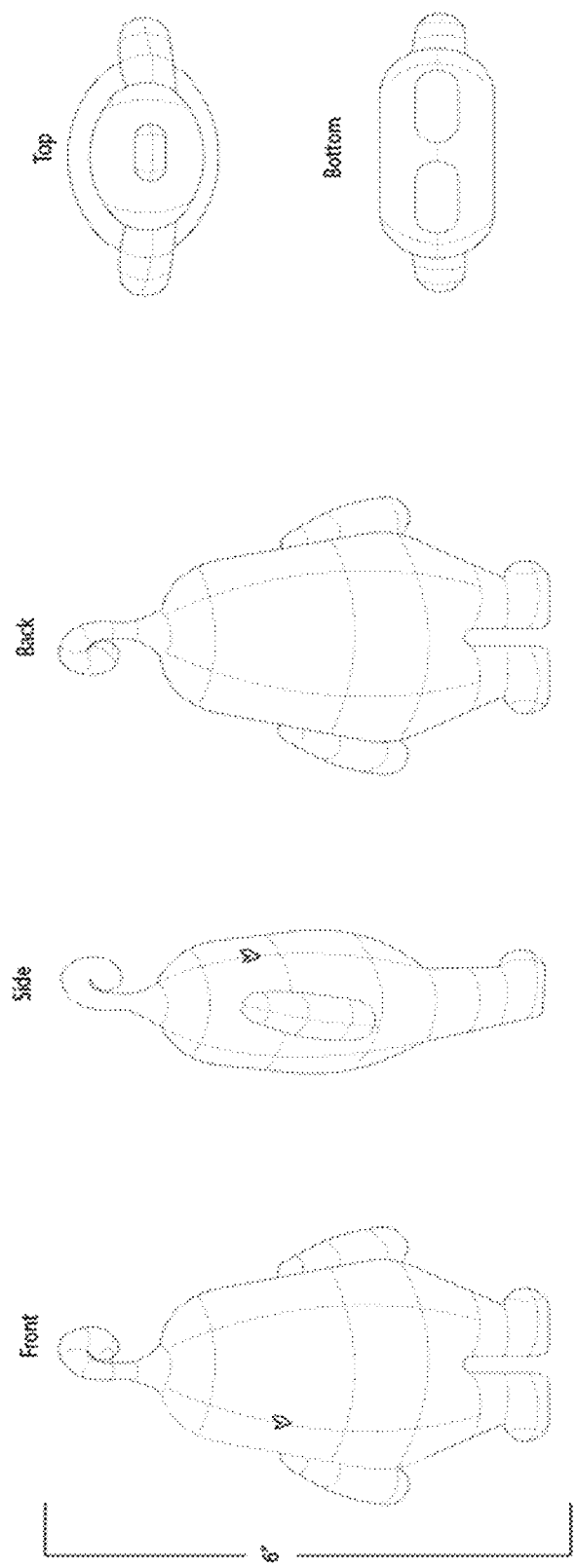
Figure 11:
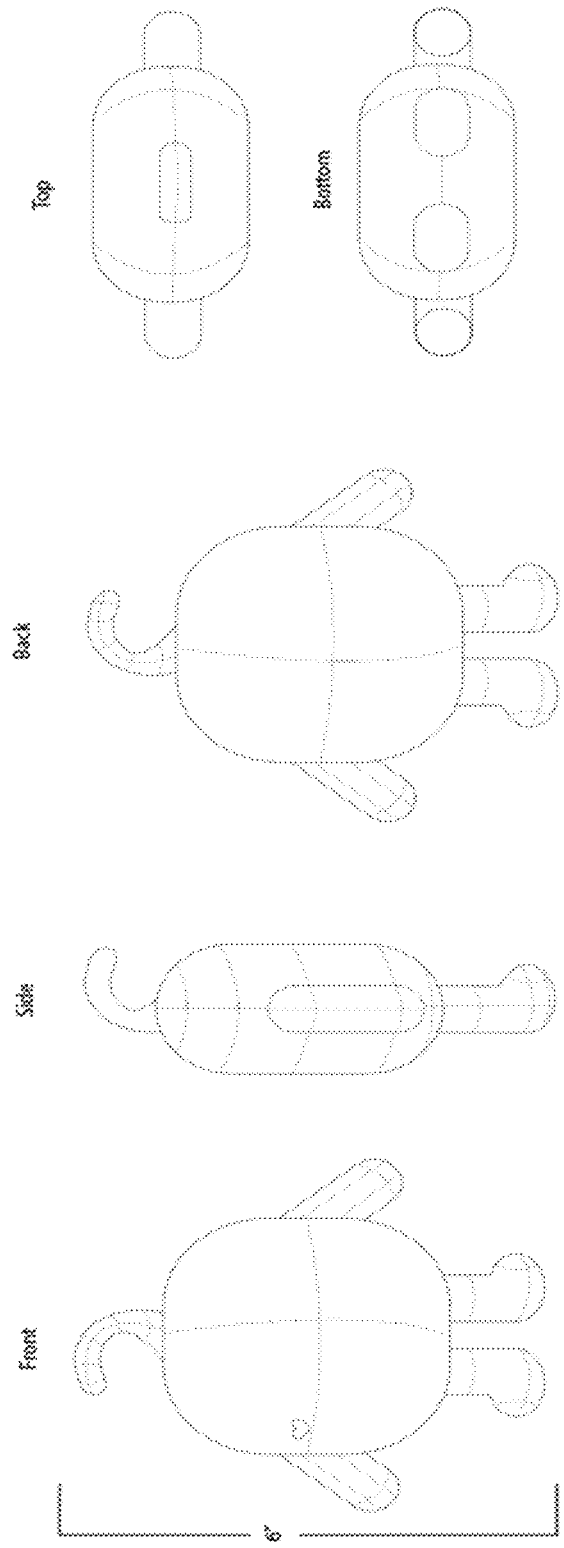
Figure 12:
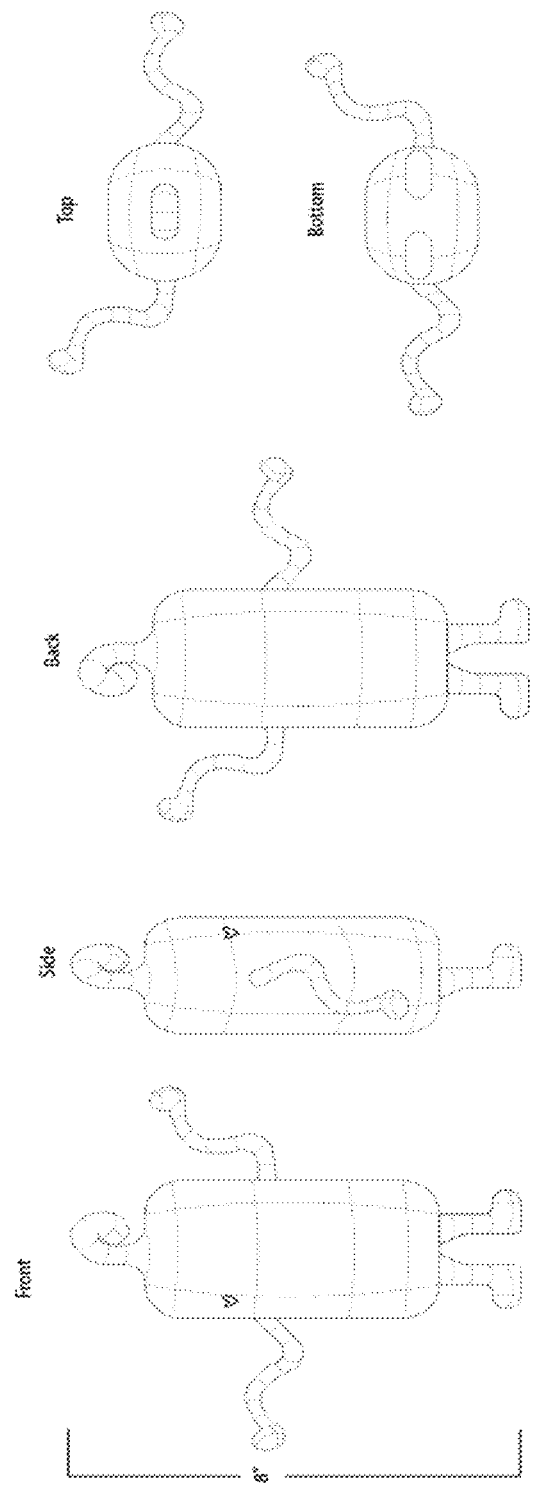

FIG. 7 illustrates a plurality of different tangible objects according to examples of the present invention.

FIG. 8 illustrates a plurality of different digital objects according to examples of the present invention.

FIGS. 9-12 illustrates a digital object in each of its views according to an example of the present invention. As shown, each of the images include an illustration of six sides of each of the digital objects. The digital objects can also be tangible objects having similar bodies and features according to an example.

Figure 13:
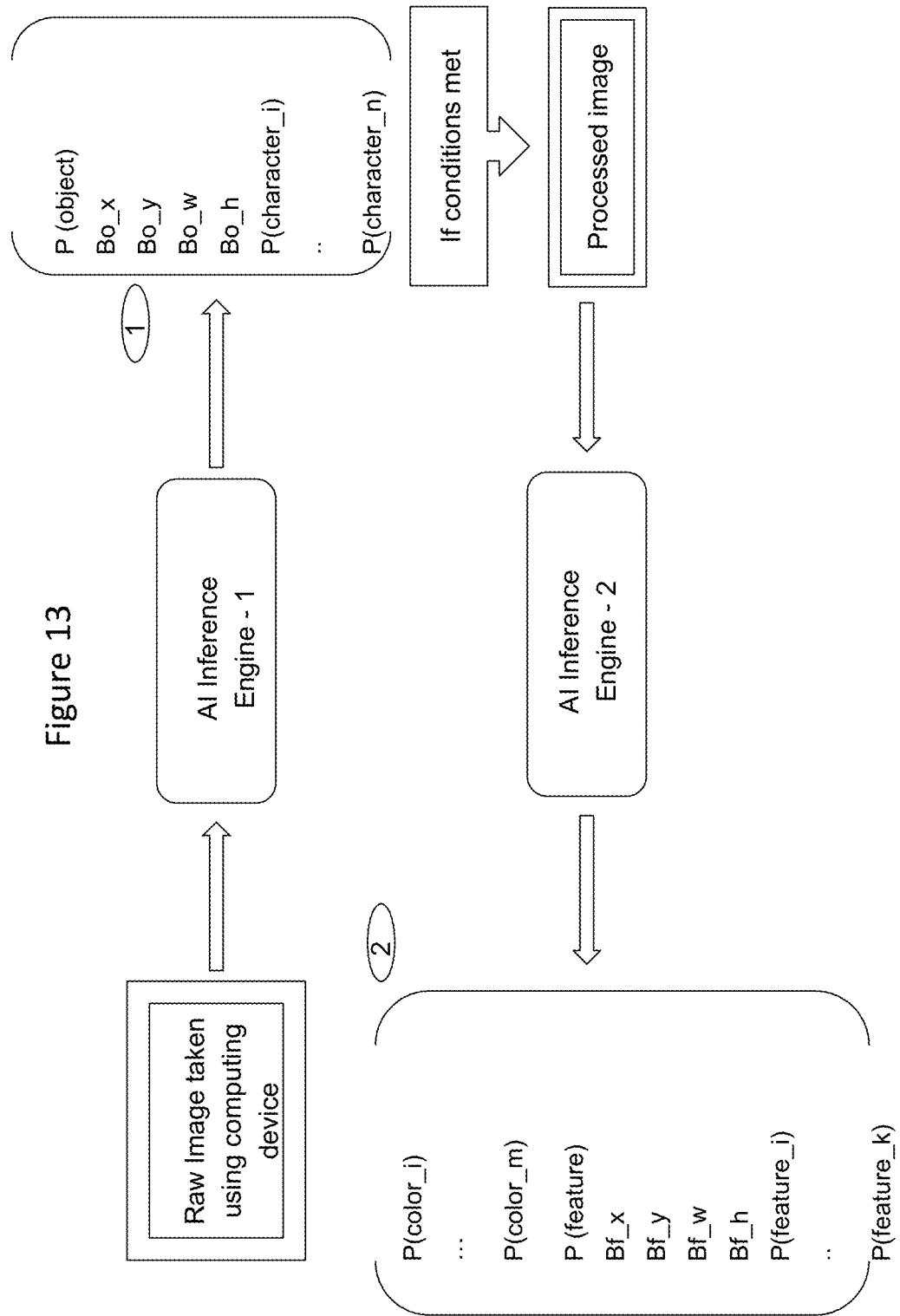
FIG. 13 is a simplified flow diagram of an AI process for creating the digitized customized object according to an example of the present invention.

FIG. 13 is a simplified flow diagram of an AI process for creating the digitized customized object according to an example of the present invention. As shown, the raw image of the customized tangible object in a pixel domain is captured. The image is processed through a first inference engine using AI processes. The output is shown. If conditions are met, the processed image is run through a second inference engine to output a plurality of features associated with the customized tangible object. As shown, inference engines 1 and 2 are used to determine which digital character (including its phenotype) to show on the screen of the computing device. Further details are provided below.

Details of 1:
P(object) is objectness score, a probability showing whether the object exists in the image or not.
Bo_x, Bo_y, Bo_w, and Bo_h are the coordinates and the sizes of the bounding box containing the object.
P(character_i), i being 1 to n (number of possible characters), are the class scores, probabilities of each character being shown in the detected part of the image.

Details of 2:
P(color_i), i being 1 to m(number of possible colors), are the color class scores, probabilities of each character's color.
P(feature) is objectness score, a probability showing whether a feature exists in the image or not.
Bf_x, Bf_y, Bf_w, and Bf_h are the coordinates and the sizes of the bounding box containing the feature.
P(feature_i), i being 1 to k(number of possible features), are the class scores, probabilities of each feature being shown in the detected part of the image.

Figure 14:
FIGS. 14, 15, and 16 are images illustrating an example according to a present process of the invention.
Figure 15:
Figure 16:
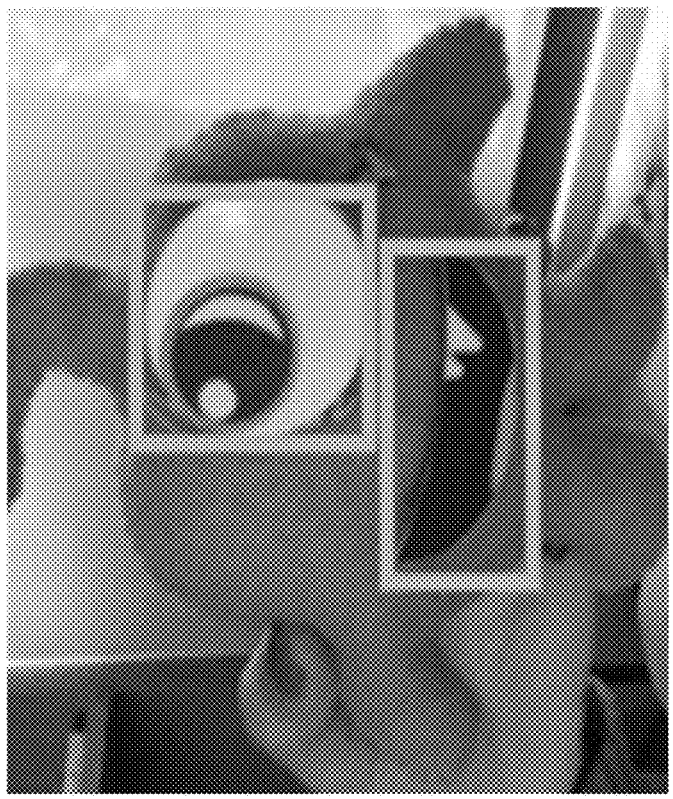

As an example, the present process includes the following steps:
Starting data: image of the tangible. See FIG. 14.
Processing: detect the character if there is one.
Intermediary data: the coordinates of the bounding boxes of the character, if there is a character in the picture: 1,(x,y,w,h). See FIG. 15.
Processing: cut the image to focus on the character and detect the features if they are on the tangibles.
Intermediary data: the coordinates of bounding boxes containing the features, their type and the color of the tangible: color_234, eye_12, (x,y,w,h), mouth_13, (x,y,w,h).
Resulting data shown on screen: Digital character with color color_234 and eye_12 located in (x,y,w,h) and mouth_13 located in (x,y,w,h). See FIG. 16.

In an example, the digital object creates different interactions. When the digital object is accessed it prompts the user to create different tangible bodies. Once the user has created a tangible body, it will share what it created with the digital object. The digital object will recognize the assets and the body. Depending on what the tangible is showing the digital object will suggest different activities for the user to follow. The interaction between the digital object and the tangible object will continue throughout the experience. Of course, there can be other variations, modifications, and alternatives. Further details of experiments according to our examples are further described below.

EXAMPLE

To prove the principle and operation of the present invention, we have prepared a certain object, customized the object with features, and digitized the object. As an example, the object was digitized using an artificial intelligence technique.

In an example our invention provides certain benefits and/or advantages to conventional learning techniques. As an example, the present invention provides kids the ability to anchor abstract thoughts and emotions into physical versions they can learn from and share with others. As an example, to better understand and appreciate the impact that our invention can bring, we conducted a study at a local pre-school in San Diego, California We were invited into a classroom with twenty five (25) kids ranging in ages from 3-6 years old. Our hypothesis was that when given a tangible that kids can manipulate, kids would be able to express themselves more easily. We measured the quality of expression by length of conversation, and by the amount of intervention needed from the facilitator to continue the conversation.

As an example, we created a set of questions that we wanted to ask the kids on the first day with no tangible and repeat the exact same set of questions on a different day with a tangible. The questions were as follows:
1. How are you feeling?
   a. Can you tell me a story about when you felt that way?
2. What is something you like to feel?
   a. Can you tell me a story about when you felt that way?
3. What is something you do not like to feel?
   a. Can you tell me a story about when you felt that way?

In our experiment, we had a control, independent variable, and dependent variable as described below:
Control: Asking questions without a tangible object
Independent variable: a tangible object
Dependent variable: length of conversation with and without the tangible object.

When we conducted the experiment, on average the length of conversations when asking kids the questions above with no tangible was about 1:45 minutes with an average of 3.5 moments of intervention from the facilitator. Once a tangible object was introduced to the kids, the average length of conversation was about 4:15 minutes with an average of 2 moments of intervention from the facilitator.

Our results were completely unexpected. That is, our study shows that by introducing a tangible object, kids were able to express their emotions more fluidly and in greater depth. By giving kids tools such as our intervention we will be helping kids strengthen their emotional awareness, expression and regulation skills. Skills that are crucial to kids' present and future mental health and wellbeing. These and other benefits and/or advantages can be achieved by way of using the present invention.

Also, the functions of several elements may, in alternative embodiments or examples, be carried out by fewer, or a single, element. Similarly, in some embodiments, any functional element may perform fewer, or different, operations than those described with respect to the illustrated embodiment or example. Also, functional elements shown as distinct for purposes of illustration may be incorporated within other functional elements in a particular implementation. Also, the sequencing of functions or portions of functions generally may be altered. Certain functional elements, files, data structures, and so one may be described in the illustrated embodiments as located in system memory of a particular or hub. In other embodiments, however, they may be located on, or distributed across, systems or other platforms that are co-located and/or remote from each other. For example, any one or more of data files or data structures described as co-located on and "local" to a server or other computer may be located in a computer system or systems remote from the server. In addition, it will be understood by those skilled in the relevant art that control and data flows between and among functional elements and various data structures may vary in many ways from the control and data flows described above or in documents incorporated by reference herein. More particularly, intermediary functional elements may direct control or data flows, and the functions of various elements may be combined, divided, or otherwise rearranged to allow parallel processing or for other reasons. Also, intermediate data structures of files may be used and various described data structures of files may be combined or otherwise arranged.

In other examples, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A method for creating a physical object by a child and processing the physical object to convert the physical object into a virtual object for use on a computing device, the method comprising:
   providing a tangible body, including a surface region;
   providing a plurality of features for the surface region of the body;
   assembling the plurality of features onto the body to form a customized tangible body including the features, each of the features being configured onto a portion of the tangible body in a designated spatial configuration on the portion of the tangible body;
   aligning the customized tangible body to an image capturing region of an image capturing device, the image capturing device being coupled to a computing device;
   capturing an image of the customized tangible body using the image capturing device in a pixel domain and processing the image in the pixel domain to convert the image in the pixel domain into an image file;
   processing the image file using an AI inference engine to output at least a character type of the tangible body, a type of each of the features, a spatial location of each of the features, and a color of each of the features, each of which defines a phenotype of the customized tangible body;
   storing information associated with the character type, type of each of the features, the spatial location of each of the features, and the color of each of the features into a memory location on the computing device;
   processing each of the phenotypes of the customized tangible body to determine a complete phenotype of the customized tangible body;
   using the complete phenotype information of the customized tangible body to identify a digital body of the complete phenotype from a plurality of digital bodies stored in a server coupled to the computing device; and
   retrieving the digital body from the server and configuring the digital body on the computing device; and
   interacting with an operation of the digital body by a user, the operation of the digital body including an interaction with the customized tangible body in digital form;
   wherein the interacting with the customized tangible body in digital form includes at least one activity from reading a story, telling a story, drawing, singing, dancing, animations, and combinations thereof to increase an attention span of the user from about one minute to four minutes and greater.

2. The method of claim 1 wherein the image file is one of a PNG, GIF, HEIC, and TIFF; wherein the computing device is coupled to a network or off-line.

3. The method of claim 1 wherein the type of tangible body comprises one of a human character, an animal character, or a fictional character; wherein the color of each of the features comprises one of red, blue, green, yellow, orange, and combinations thereof; wherein the spatial location is one of an upper portion, a center portion, or a lower portion.

4. The method of claim 1 wherein each of the features is selected from an eye, a mouth, a nose, hair, a clothing item, a decoration, or other assets.

5. The method of claim 1 wherein the interaction with the customized tangible body includes reading a story, telling a story, drawing, singing, dancing, animations, and combinations thereof.

6. The method of claim 1 wherein the AI inference engine determines P(object) consisting of an objectness score; the AI inference engine determines Bo_x, Bo_y, Bo_w, and Bo_h, each of which corresponds to a coordinate and a size of a bounding box containing the object; and the AI inference engine determines P(character_i), i being 1 to n(number of possible characters).

7. The method of claim 1 wherein the AI inference engine determines P(color_i), i being 1 to m(number of possible colors), wherein the AI inference engine determines P(feature) consisting of an objectness score; wherein the AI inference engine determines Bf_x, Bf_y, Bf_w, and Bf_h each of which is a coordinate and a size of a bounding box containing the feature; wherein the AI inference engine determines P(feature_i), i being 1 to k (number of possible features).

8. The method of claim 1 wherein the AI inference engine includes a first AI inference engine and a second AI inference engine, the second AI inference engine outputting each of the phenotypes.

9. The method of claim 1 wherein the AI inference engine includes a first AI inference engine and a second AI inference engine, the second AI inference engine outputting each of the phenotypes.

10. A method for creating a physical object by a child and processing the physical object to convert the physical object into a virtual object for use on a computing device, the method comprising:
provide a tangible body, including a surface region;
providing a plurality of features for the surface region of the body;
assembling the plurality of features onto the body to form a customized tangible body including the features, each of the features being configured onto a portion of the tangible body in a designated spatial configuration on the portion of the tangible body;
aligning the customized tangible body to an image capturing region of an image capturing device, the image capturing device being coupled to a computing device;
capturing an image of the customized tangible body using the image capturing device in a pixel domain;
processing the image in the pixel domain to convert the image in the pixel domain into a portable image file;
processing the portable image file using a plurality of AI inference engines to output at least a character type of the tangible body, a type of each of the features, a spatial location of each of the features, and a color of each of the features, each of which defines a phenotype of the customized tangible body;
storing information associated with the character type, type of each of the features, the spatial location of each of the features, and the color of each of the features into a memory location on the computing device;
processing each of the phenotypes of the customized tangible body to determine a complete phenotype of the customized tangible body;
using the complete phenotype information of the customized tangible body to identify a digital body of the complete phenotype from a plurality of digital bodies stored in a server coupled to the computing device; and
retrieving the digital body from the server and configuring the digital body on the computing device; and
interacting with an operation of the digital body by a user, the operation of the digital body including an interaction with the customized tangible body in digital form;
wherein the interacting with the customized tangible body in digital form includes reading a story, telling a story, drawing, singing, dancing, animations, and combinations thereof to increase an attention span of the user from about one minute to four minutes and greater.

11. The method of claim 10 wherein the portable image file is one of a PNG, GIF, HEIC, and TIFF; wherein the computing device is coupled to a network or off-line.

12. The method of claim 11 wherein the type of tangible body comprises one of a human character, an animal character, or a fictional character; wherein the color of each of the features comprises one of red, blue, green, yellow, orange, and combinations thereof;
wherein the spatial location is one of an upper portion, a center portion, or a lower portion.

13. The method of claim 12 wherein each of the features is selected from an eye, a mouth, a nose, hair, a clothing item, a decoration, or other assets.

14. The method of claim 13 wherein the interaction with the customized tangible body includes reading a story, telling a story, drawing, singing, dancing, animations, and combinations thereof.

15. The method of claim 10 wherein at least one of the plurality of AI inference engines determines P(object) consisting of an objectness score; the AI inference engine determines $Bo\_x$, $Bo\_y$, $Bo\_w$, and $Bo\_h$, each of which corresponds to a coordinate and a size of a bounding box containing the object; and the AI inference engine determines $P(character\_i)$, i being 1 to n(number of possible characters).

16. The method of claim 10 wherein at least one of the plurality of AI inference engines determines $P(color\_i)$, i being 1 to m(number of possible colors), wherein the AI inference engine determines P(feature) consisting of an objectness score; wherein the AI inference engine determines $Bf\_x$, $Bf\_y$, $Bf\_w$, and $Bf\_h$ each of which is a coordinate and a size of a bounding box containing the feature; wherein the AI inference engine determines $P(feature\_i)$, i being 1 to k (number of possible features).

17. The method of claim 10 wherein the plurality of AI inference engines includes a first AI inference engine and a second AI inference engine, the second AI inference engine outputting each of the phenotypes.

18. The method of claim 10 wherein the plurality of AI inference engines includes a first AI inference engine and a second AI inference engine, the second AI inference engine outputting each of the phenotypes.

* * * * *